United States Patent [19]

Lomax et al.

[11] 4,103,800
[45] Aug. 1, 1978

[54] BACKING MATERIAL

[76] Inventors: Donald P. Lomax, 706 S. Waterville Lake Rd., Oconomowoc, Wis. 53066; Ronald M. Boggs, Rte. 1, Box 56F, Mukwonago, Wis. 53149

[21] Appl. No.: 792,007

[22] Filed: Apr. 28, 1977

[51] Int. Cl.$^2$ .................. B32B 15/18; B65D 25/14
[52] U.S. Cl. ................. 138/145; 75/128 W; 138/172; 138/178; 220/454; 428/679; 428/681
[58] Field of Search ............ 220/63 R, 64; 428/679, 428/681; 138/172, 174, 178; 75/128 W; 148/36

[56] References Cited

U.S. PATENT DOCUMENTS

| | | | |
|---|---|---|---|
| 3,489,620 | 1/1970 | Current | 148/36 |
| 3,658,515 | 4/1972 | Saltzman | 75/128 F |
| 3,793,012 | 2/1974 | Walter et al. | 75/171 |
| 3,793,013 | 2/1974 | Walter et al. | 75/171 |
| 4,026,727 | 5/1977 | Finkl et al. | 148/36 |

OTHER PUBLICATIONS

Engineering Alloys Digest, Inc., AISI–8620, 2/58.
AISI Steel Products Manual, "Steel Specialty Tubular Products," p.41, 2/72.
AISI Steel Products Manual, "Carbon Steel Pipe, Structural Tubing," Line Pipe, Oil Country Tubular Goods, 8/73, pp. 16,17.

*Primary Examiner*—Arthur J. Steiner

[57] ABSTRACT

A low alloy nickel-manganese steel consists essentially of carbon 0.18-0.23 weight percent, manganese 0.70-0.90 weight percent, silicon 0.20-0.35 weight percent, chromium 0.40-0.60 weight percent, nickel 0.40-0.70 weight percent, molybdenum 0.15-0.25 weight percent and the balance iron. The steel is especially well suited for use as a backing material for bimetallic cylinders prepared by the centrifugal casting process. The backing material has improved stability at the temperatures employed during centrifugally casting a layer of a lining alloy within a cylinder of the backing material. The backing also has improved weldability and less tendency to develop residual bending stresses under the temperatures and pressures encountered during manufacture and use of the cylinder.

2 Claims, No Drawings

BACKING MATERIAL

FIELD OF THE INVENTION

This invention relates generally to the art of bimetallic cylinders and more particularly to an improved bimetallic cylinder backing steel.

BACKGROUND OF THE INVENTION

Steel cylinders have been employed for many years as principal components of plastic extrusion and ejection molding equipment. Typically in such equipment, a metal screw is driven within a steel cylinder to force a fluid plastic material through a die. Because the temperatures and pressures involved in the extrusion processes are quite high, and because of the increased use of abrasive fillers in modern plastics, the cylinders (or barrels as they are commonly called) are subjected to abrasion and corrosion which reduces the useful life of the barrels.

Bimetallic cylinders were developed as a solution to these problems. In a typical bimetallic cylinder, the bore of the barrel is coated on its inner surface with a thin coating of an abrasion and corrosion resistant alloy.

The process for preparing such cylinders includes providing a cylindrical steel barrel which has an inside diameter slightly larger than that desired for the final extrusion or injection molding operation. A measured quantity of a suitable lining alloy, usually in pellet or shot form, is then placed inside the bore of the cylinder. The open ends of the cylinder are closed by welding end plates over them and the loaded cylinder is placed in a furnace and heated above the melting point of the lining alloy but below the melting temperature of the backing steel.

Following a heating period determined for the particular lining alloy, the cylinder is placed on a bed of power driven rollers in a horizontal position and rapidly spun to centrifugally cast the melted lining alloy over the cylindrical bore of the barrel. The cylinder is cooled below the melting temperature of the lining alloy during spinning and is then placed within a bed of insulating material for a controlled cooling period to prevent cracking of the alloy and to insure a good bond between the lining and the backing steel.

Finally, the cylinder is prepared for use by removing the end caps and finishing the internal bore to the correct diameter and finish tolerances by conventional lathe and hone techniques.

Throughout the evolution of this process, a great deal of research has been directed to the development of appropriate lining alloys and relatively little attention has been focused on the backing steels. The most commonly used backing steel in the prior art is AISI-4140 steel which has the following composition:

| Ingredient | Weight Percent |
|---|---|
| Carbon | 0.38–0.43 |
| Manganese | 0.75–1.00 |
| Silicon | 0.20–0.35 |
| Chromium | 0.80–1.10 |
| Molybdenum | 0.15–0.25 |
| Iron | Balance |

This material is not well suited as a backing steel because it is difficult to weld and because it has a tendency to build up residual stresses during the heating and cooling steps in the lining process leading to an increased tendency to bend during extrusion and molding. These difficulties with the prior art backing material can lead to reduced cylinder lifetime and expensive straightening procedures or costly replacement of the entire cylinder. Additionally, it is known that AISI-4140 steels should be used in their heat treated condition for fully utilizing the properties of this alloy, and the repeated heating and cooling of bimetallic cylinder backings during preparation and use is subjecting the steel to conditions which are not recommended. However, 4140 steel is readily available.

Additional properties of AISI-4140 steel are listed below:

| Tensile strength psi | 90,000 |
| Yield strength psi | 65,000–70,000 |
| Elongation % in 2" | 27–25 |
| Reduction of area % | 55–50 |
| Brinell hardness, surface | 200 |

A steel backing for bimetallic cylinders which does not have the above-noted disadvantages would be a significant advance in this technology.

OBJECTS OF THE INVENTION

It is a primary object of the present invention to provide an improved backing steel for bimetallic cylinders.

An object of the present invention is to provide a backing steel for bimetallic cylinders which has desirable mechanical properties of hardness and strength and which is readily weldable with little or no preheating.

A further object of the present invention is to provide a backing steel for bimetallic cylinders which is stable at elevated temperatures without developing residual stresses and a tendency to bend under the temperatures and pressures encountered during injection molding and plastic extrusion processes.

How these and other objects of the present invention are accomplished will be described in the following specification. Generally, however, the objects are accomplished by using as a backing steel for bimetallic cylinders a low alloy nickel-manganese steel having the following chemical composition:

| Ingredient | Weight Percent |
|---|---|
| Carbon | 0.18–0.23 |
| Manganese | 0.70–0.90 |
| Silicon | 0.20–0.35 |
| Chromium | 0.40–0.60 |
| Nickel | 0.40–0.70 |
| Molybdenum | 0.15–0.25 |
| Iron | Balance. |

DESCRIPTION OF THE PREFERRED EMBODIMENT

In the preferred embodiment of the present invention a bimetallic cylinder is prepared using the general techniques outlined above. For purposes of the description reference will be made to a wear and corrosion resistant alloy developed by us and disclosed in our copending United States patent application, Ser. No. 782,625, filed Mar. 30, 1977 entitled "Lining Alloy for Bimetallic Cylinders." It is to be understood that this alloy is only representative of the alloys which can be used with the backing steel of the present invention and the example is not to be taken as limiting.

The lining alloy of the above-mentioned application consists essentially of the following ingredients in the following amounts (the weight percent shown in parenthesis is the preferred weight percent):

| Ingredient | Weight Percent | |
| --- | --- | --- |
| Carbon | 0.16–0.35 | (0.25) |
| Nickel | 28.50–34.60 | (30.40) |
| Manganese | 0.34–0.75 | (0.55) |
| Silicon | 0.75–1.90 | (1.10) |
| Cromium | 4.50–7.50 | (6.30) |
| Boron | 2.25–7.90 | (2.40) |
| Cobalt | 28.50–42.00 | (34.00) |
| Tantalum Carbide | 10.00–35.00 | (25.00) |

A backing cylinder according to the present invention is provided for this lining alloy and the backing cylinder includes the following ingredients in the amounts specified:

| Ingredient | Weight Percent |
| --- | --- |
| Carbon | 0.18–0.23 |
| Manganese | 0.70–0.90 |
| Silicon | 0.20–0.35 |
| Chromium | 0.40–0.60 |
| Nickel | 0.40–0.70 |
| Molybdenum | 0.15–0.75 |
| Iron | Balance |

The backing cylinder includes a cylindrical bore which is finished to the desired internal diameter by lathe or hone techniques. The diameter slightly exceeds the desired final diameter, the difference representing the thickness of the lining alloy. A premeasured quantity of the lining alloy is placed in the bore of the cylinder and metal plates are welded over the holes at the ends of the backing. One particular advantage of the backing employed in the present invention is that the preferred steel is readily weldable with little or no preheating, whereas the alloys of the prior art typically required time consuming preheating to form a good weld joint at the end caps.

The closed cylinder is then inserted into a furnace and the entire assembly is heated above the melting point of the alloy (i.e., to approximately 2100° F) for a time sufficient to insure that the lining material is completely melted.

The next step in the process is to remove the assembly from the furnace and to place the cylinder on a bed of horizontal rollers. The cylinder is then rapidly spun about its axis to centrifugally spread the molten alloy over the bore of the steel cylinder. The coated cylinder is cooled during the spinning cycle to bond the lining alloy onto the steel bore and the entire cylinder is then placed in a bed of insulating material (e.g. sand, silica or the like) for a controlled cooling period to assure a good bond to the steel backing of the present invention and to prevent cracking of the lining alloy.

The final steps in the production of the bimetallic cylinder are the removal of the end caps and the finishing of the cylinder using conventional lathe and hone techniques.

It can be seen from the description of the process for the preparation of a bimetallic cylinder that the backing steel is exposed to extreme and sudden variations in temperature. Moreover, the finished cylinders are employed in a hot environment since they are most frequently used at temperatures above the melting point of extrusion or molding plastics. The prior art backing materials tend to build up residual stresses during these temperature changes and a resultant tendency to bend. The backing material of the present invention however does not develop such stresses at these temperatures and remains straight in the manufacturing process and during use.

The mechanical properties of the backing steel of the present invention are also significatly better than the properties of 4140 steel. Certain properties of the backing steel are set forth in the following table:

| | |
| --- | --- |
| Tensile strength psi | 110,000 |
| Yield strength psi | 101,000 |
| Elongation % in 2" | 15 |
| Reduction of Area % | 55 |
| Bunell Hardness, surface | 223 |

The steel employed in the present invention as a backing for a bimetallic cylinder is a known material, but to the knowledge of the inventors, the prior uses for this steel would not suggest to one skilled in the art the particular suitability or the surprising improvements that this material makes possible in the bimetallic cylinder technology. Such materials have up until now been used primarily for case hardened gears, (to case harden such gears they are immersed in charcoal and heated to cause carbon to migrate to the surface of the material resulting in case hardening). Case hardening is not involved in the bimetallic cylinder process.

The backing steel provides bimetallic cylinders with improved lifetimes and results in significant timesaving during the manufacturing process. The invention has been described in connection with one preferred embodiment, but is to be limited solely by the claims which follow:

We claim:

1. In combination, a low alloy nickel-manganese steel cylinder and a lining centrifugally cast onto the inner surface of said cylinder consisting of a wear and corrosion resistant alloy, said steel cylinder being composed essentially of the following elements in the weight percentage composition stated below:

| Ingredient | Weight Percent |
| --- | --- |
| Carbon | 0.18–0.23 |
| Manganese | 0.70–0.90 |
| Silicon | 0.20–0.35 |
| Chromium | 0.40–0.60 |
| Nickel | 0.40–0.70 |
| Molybdenum | 0.15–0.25 |
| Iron | Balance. |

2. In combination, a low alloy nickel-manganese steel cylinder and a lining centrifugally cast onto the inner surface of said cylinder consisting of a wear and corrosion resistant alloy, said steel cylinder being composed essentially of the following elements in the weight percentage composition stated below:

| Ingredient | Weight Percent |
| --- | --- |
| Carbon | 0.18–0.23 |
| Manganese | 0.70–0.90 |
| Silicon | 0.20–0.35 |
| Chromium | 0.40–0.60 |
| Nickel | 0.40–0.70 |
| Molybdenum | 0.15–0.25 |
| Iron | Balance. | and wherein said lining alloy consists essentially of the following materials in the weight percentage composition stated below:

| Ingredient | Weight Percent |
|---|---|
| Carbon | 0.16–0.35 |
| Nickel | 28.50–34.60 |
| Manganese | 0.34–0.75 |

-continued

| Ingredient | Weight Percent |
|---|---|
| Silicon | 0.75–1.90 |
| Chromium | 4.50–7.50 |
| Boron | 2.25–7.90 |
| Cobalt | 28.50–42.00 |
| Tantalum Carbide | 10.00–35.00 |

* * * * *